J. W. EVANS.
PIANO-FORTE ACTIONS.
No. 193,325.  Patented July 24, 1877.
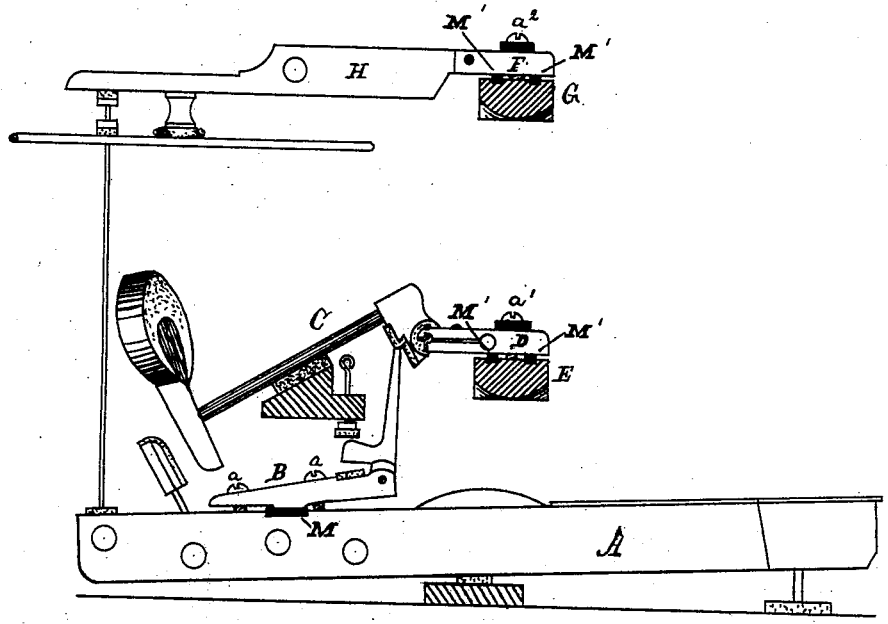
Witnesses
Torde R. Smith
Jas A Cowles
J. W. Evans  Inventor
By Munday & Evarts  Attorneys

UNITED STATES PATENT OFFICE.

JOHN W. EVANS, OF CHICAGO, ILLINOIS.

IMPROVEMENT IN PIANO-FORTE ACTIONS.

Specification forming part of Letters Patent No. 193,325, dated July 24, 1877; application filed February 5, 1877.

*To all whom it may concern:*

Be it known that I, JOHN W. EVANS, of Chicago, in the county of Cook and State of Illinois, have invented certain Improvements in Piano-Fortes, of which the following is a specification:

Piano-makers have experienced a great deal of trouble from the loosening of the fastenings of the "action" devices, caused by the shrinking and expanding of the wooden parts of the action under varying atmospheric conditions. A very inconsiderable amount of moisture in the air beyond the normal amount will cause the wood to expand. This does no particular harm; but when the air becomes dry again, and thereby dries the wood, it causes a shrinkage back to its original size, and leaves all the fastenings loose. The delicate nature of the mechanism is such that a very slight displacement of the parts will render it inoperative.

The joints in a piano-forte action most likely to be loosened by the weather are those where screws are employed to secure one piece of wood to another. Such joints or fastenings occur between what is termed the "jack" and the key, between the hammer-rail and the hammer-flange, and between the damper-rail and the damper-flange, as actions are now commonly constructed.

In the present invention I obviate this liability of the screw-fastened connections to shrink loose by interposing at some point in the joint a piece of india-rubber, which is compressed by the screw or screws that fastens the pieces of wood together, and when the shrinkage occurs this compressed piece of rubber expands, and thus takes up the slack.

In the accompanying drawing, which forms a part of this specification, is shown a side view of a common piano-forte action.

In said drawing, A is the key. B is the jack. C is the hammer. D is the hammer-flange. E is the hammer-rail. F is the damper-flange, and G is the damper-rail. H is the damper.

The base of the jack B is secured to the key by screws $a\ a$. Between this base and the upper part of the key is interposed a piece of india-rubber, M, and I set the screws tightly home to bring a considerable pressure to bear upon the rubber.

The hammer-flange D is fastened to the hammer-rail E by a screw, $a^1$, and the damper-flange F in like manner to the damper-rail by a screw, $a^2$. Between these flanges and their respective rails rubber is interposed, preferably in long strips M' M', which may be placed in grooves in the upper surface of the rail, and may extend the whole length of the rail, the same strips serving in such case for all the flanges attached to the rail. The rubber is thus very easily and quickly applied.

When the screws are set home tightly the flanges are held secure at all times without danger of loosening.

In addition to the piece or pieces of rubber interposed between the pieces of wood, I sometimes apply a rubber washer to the screw, between the head and the wood, which acts in conjunction with the rubber between the pieces of wood, and sometimes I use only the washer without the other piece or pieces. The washer alone is more convenient where pianos already built are to be supplied with this improvement.

I am well aware that flexible washers, of leather and similar materials, have been used upon bolts for producing friction, and to fill out a vacant space. Such I do not claim as my invention.

That which I claim as new and my invention is—

The piano-forte action in which the rigid wooden joints are provided with a compressed spring for compensating the shrinkage of the wood, substantially as specified.

J. W. EVANS.

Witnesses:
JOHN W. MUNDAY,
FORDE R. SMITH.